(12) United States Patent
Moon

(10) Patent No.: US 10,630,932 B2
(45) Date of Patent: Apr. 21, 2020

(54) TELEVISION VIEWING CONTROL APPARATUS

(71) Applicant: Byung Chul Moon, Chungcheongbuk-do (KR)

(72) Inventor: Byung Chul Moon, Chungcheongbuk-do (KR)

( * ) Notice: Subject to any disclaimer, the term of this patent is extended or adjusted under 35 U.S.C. 154(b) by 2 days.

(21) Appl. No.: 16/472,894

(22) PCT Filed: Dec. 28, 2017

(86) PCT No.: PCT/KR2017/015606
§ 371 (c)(1),
(2) Date: Jun. 23, 2019

(87) PCT Pub. No.: WO2018/128326
PCT Pub. Date: Jul. 12, 2018

(65) Prior Publication Data
US 2019/0320132 A1    Oct. 17, 2019

(30) Foreign Application Priority Data

Jan. 3, 2017  (KR) .......................... 10-2017-0000529

(51) Int. Cl.
| | | |
|---|---|---|
| *H04N 5/57* | (2006.01) | |
| *G01S 15/08* | (2006.01) | |
| *H04N 5/44* | (2011.01) | |
| *H04N 7/10* | (2006.01) | |

(52) U.S. Cl.
CPC .............. *H04N 5/57* (2013.01); *G01S 15/08* (2013.01); *H04N 5/4403* (2013.01); *H04N 7/104* (2013.01); *H04N 2005/4425* (2013.01)

(58) Field of Classification Search
None
See application file for complete search history.

(56) References Cited

U.S. PATENT DOCUMENTS

| | | | |
|---|---|---|---|
| 2004/0239517 A1* | 12/2004 | Coley | ..................... G08B 21/02 340/686.6 |
| 2016/0140913 A1 | 5/2016 | Aragane et al. | |
| 2016/0156966 A1* | 6/2016 | Matsubayashi | ........ G09G 5/006 348/723 |
| 2018/0144714 A1* | 5/2018 | Khorasani | ................ G09G 5/02 |

FOREIGN PATENT DOCUMENTS

| | | | |
|---|---|---|---|
| KR | 10-2002-0033151 A | 5/2002 | |
| KR | 10-2008-0064632 A | 7/2008 | |
| KR | 10-2011-0092369 A | 8/2011 | |
| KR | 20-2012-0006105 U | 8/2012 | |
| KR | 10-2016-0023810 A | 3/2016 | |

OTHER PUBLICATIONS

International Search Report for PCT/KR2017/015606 dated Apr. 26, 2018 from Korean Intellectual Property Office.

* cited by examiner

*Primary Examiner* — Samira Monshi
(74) *Attorney, Agent, or Firm* — Revolution IP, PLLC

(57) ABSTRACT

A television viewing control apparatus includes a distance setting unit, a time setting unit, an ultrasonic sensor, a mounted wireless communication module, and a control unit to perform control to regulate television viewing when a distance between a viewer and the television is measured and the viewer views the television at a position within a set distance or when a remote control signal is received from a smartphone over a wireless network.

1 Claim, 5 Drawing Sheets

[FIG. 1]
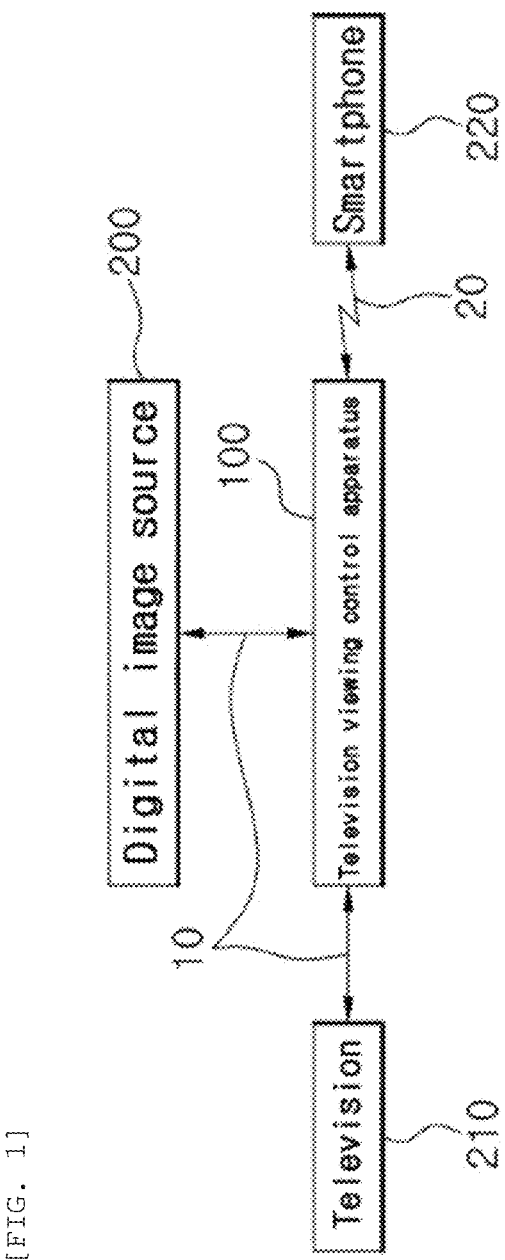

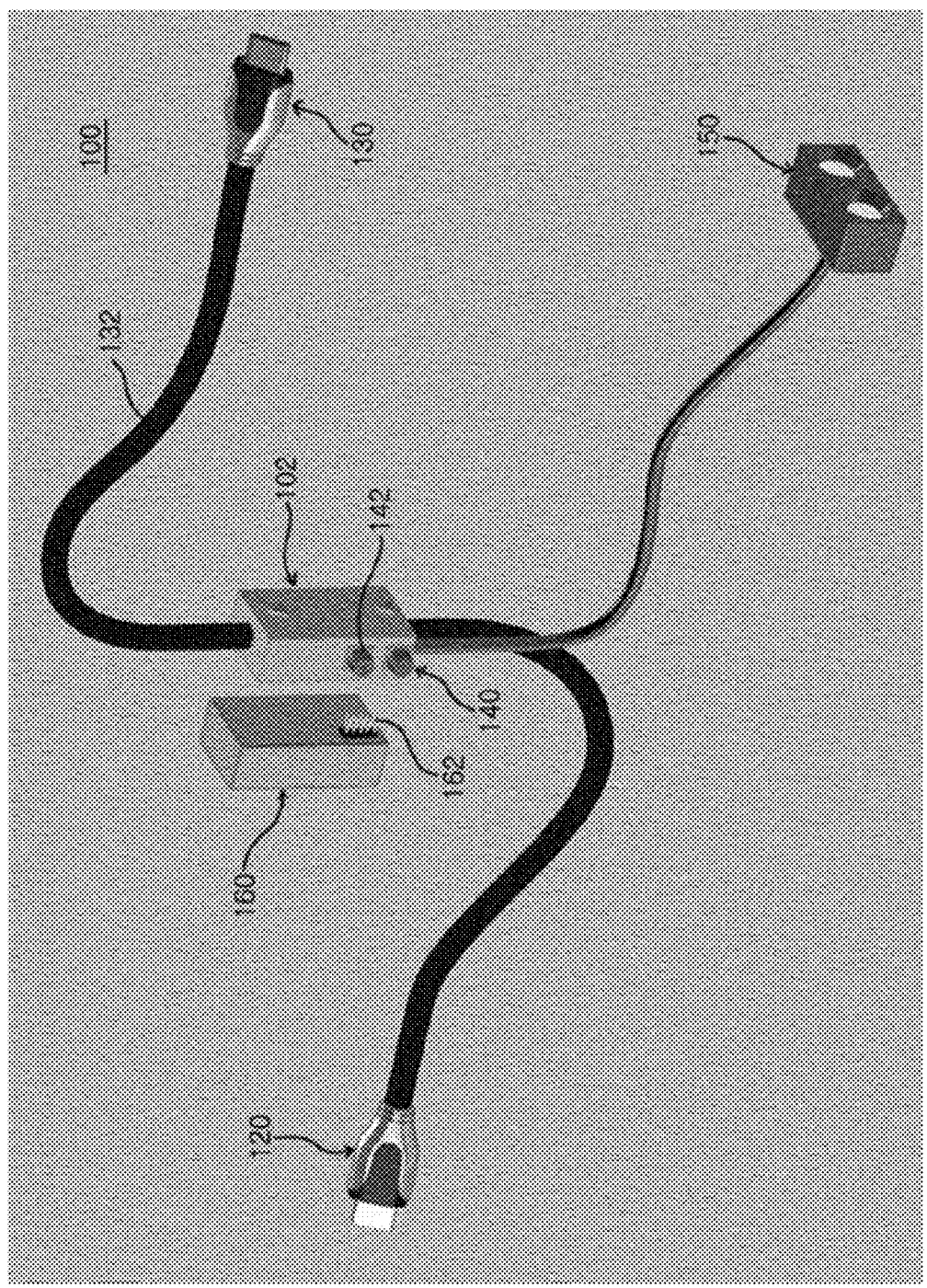
[FIG. 2]

[FIG. 3]
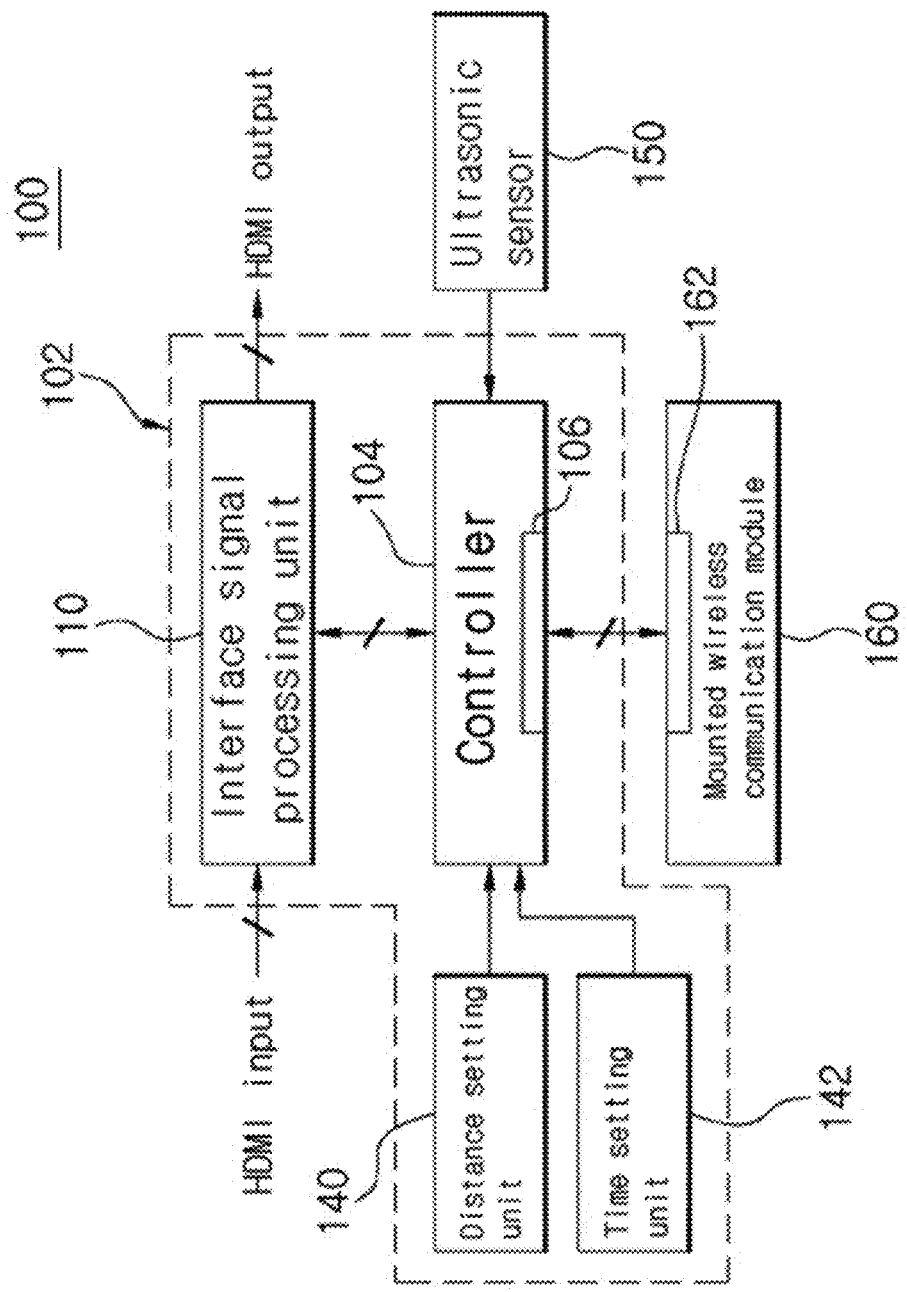

[FIG. 4]
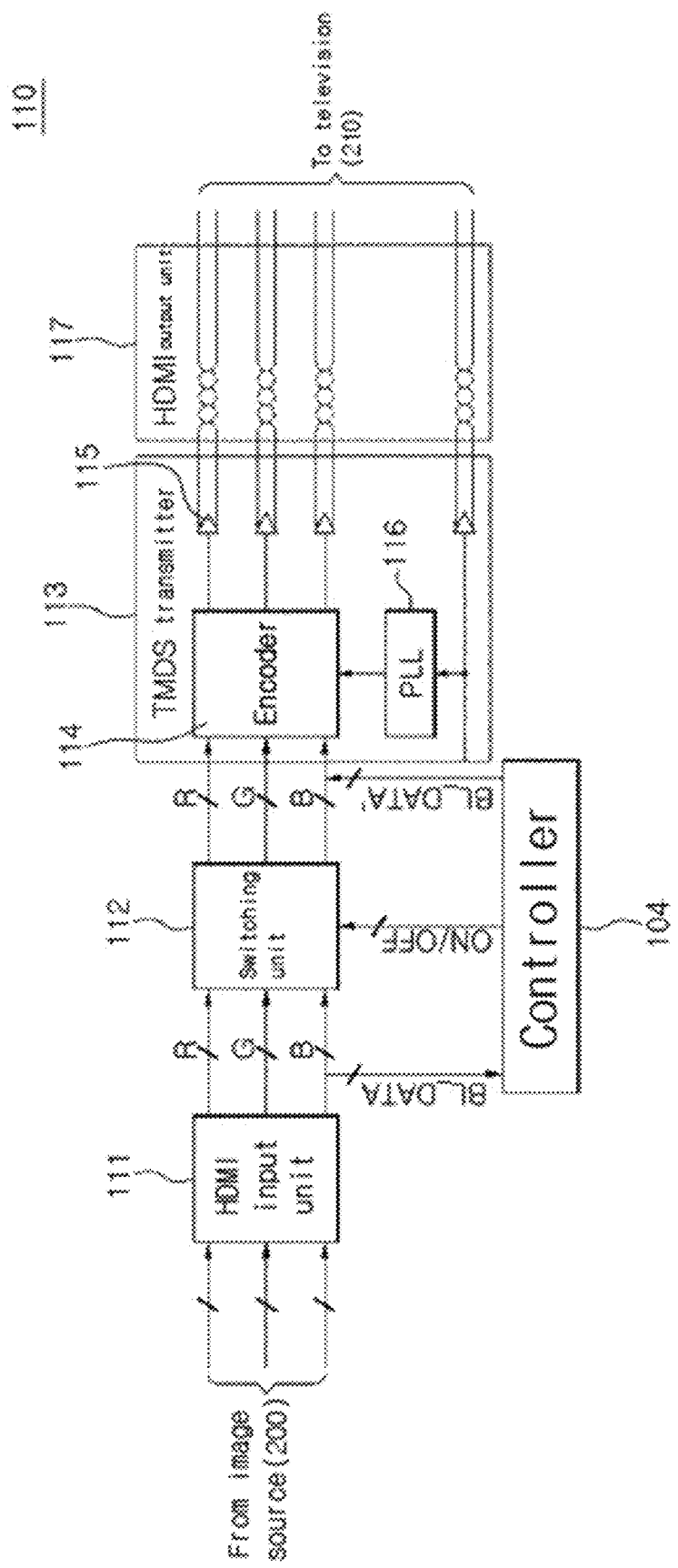

[FIG. 5]
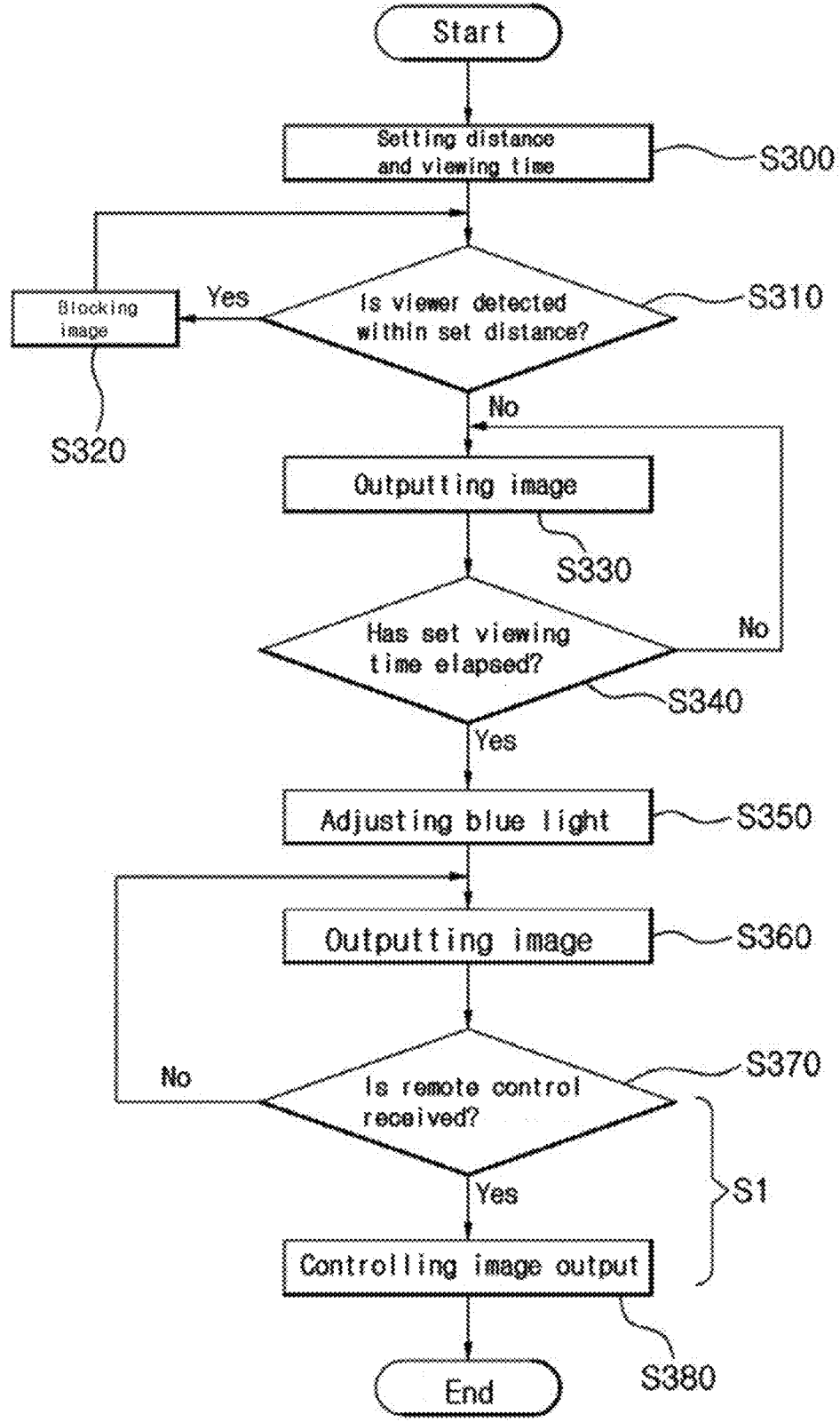

TELEVISION VIEWING CONTROL APPARATUS

TECHNICAL FIELD

The present invention relates to a television viewing control apparatus. More particularly, the present invention relates to a television viewing control apparatus and a control method thereof, wherein the apparatus is connected to an interface connector of a television, uses an ultrasonic sensor to measure a distance to a viewer, performs control to regulate an image and audio from the television when the viewer is detected within a set distance, controls blue light to minimize bad influence on eyesight due to continuous viewing, and cooperates with a smartphone over a wireless network to perform control for regulating television viewing.

BACKGROUND ART

Nowadays, negative effects of excessive television (TV) viewing on children in infancy, childhood, and adolescence have been revealed from various research. Nevertheless, there is a lack of means of proper regulation, so that it is difficult for parents to regulate television viewing.

Particularly, TV viewing in infancy forms a sense of space and perception through a TV before a sense of space and perception for the actual situation are completed, so that there is a phenomenon in which the cognitive ability in actual reality is degraded. Further, due to the increase in size and the popularization of 3D TVs, negative effects associated therewith are increasing.

Also, the bad influence of blue light on eyesight which watching TV is well known. The blue light is a blue light source that is emitted usually from, for example, a computer display device, a smartphone, a TV, and the like, and has a wavelength between about 380 and 500 nm. However, prolonged exposure to blue light causes eye strain as well as dry eye syndrome and in severe cases, may damage the retina or the lens in the eye. Also, if viewing the smartphone, the PC, the TV, or the like for a long time late at night, blue light hinders sleep-inducing hormone secretion and interferes with sleep.

Despite these side effects, parents sometimes have difficulties with their children because there is no means for regulating their children's TV viewing. Therefore, it is necessary to develop means to solve these problems easily.

DISCLOSURE

Technical Problem

The present invention is intended to provide a television viewing control apparatus and a control method thereof to regulate television viewing time and close viewing for the children in adolescence so that children's eyesight is protected and television viewing habits are improved.

Also, the present invention is intended to provide a television viewing control apparatus and a control method thereof to automatically adjust the blue light during continuous television viewing, thereby minimizing bad influence on eyesight.

Also, the present invention is intended to provide a television viewing control apparatus and a control method thereof to remotely control television viewing by cooperating with a smartphone.

Technical Solution

In order to achieve the above objects, according to an aspect, a television viewing control apparatus of the present invention is provided between a digital image source and a television and is configured to measure a distance between a viewer and the television in real time such that output of digital image data input to the television is blocked, to check continuous viewing time such that blue light of the digital image data is reprocessed for output, or to remotely control television viewing through a wireless network. The television viewing control apparatus of the present invention regulates the television viewing time and close viewing for children in adolescence such that children's eyesight is protected and television viewing habits are improved.

According to the aspect, the television viewing control apparatus of the present invention includes: a first digital interface connector provided in a digital image source; a second digital interface connector provided in a television; a distance setting unit setting a viewing distance between the television and a viewer; an ultrasonic sensor measuring a viewing distance between the television and the viewer; an interface signal processing unit receiving a digital image data signal from the first digital interface connector to process the digital image data signal for each of multiple channels and outputting the resulting signal to the second digital interface connector; and a controller storing the distance information set by the distance setting unit and controlling the interface signal processing unit in such a manner as to block the digital image data signal output from the first digital interface connector to the second digital interface connector when the viewing distance measured by the ultrasonic sensor is within the viewing distance set by the distance setting unit.

In an embodiment of the aspect, the television viewing control apparatus may further include a time setting unit setting a viewing time that the viewer is allowed to continuously view the television, wherein the controller may store time information set by the time setting unit and may further control the interface signal processing unit in such a manner that when the viewer is detected by the ultrasonic sensor and the viewing time set by the time setting unit elapses, blue light of the digital image data signal provided from the first digital interface connector is adjusted and the digital image data signal of which the blue light is adjusted is reprocessed and is output to the second digital interface connector.

In another embodiment, the television viewing control apparatus may further include a mounted wireless communication module receiving a remote control signal from a smartphone over a wireless network and providing the same to the controller, wherein the controller may further control the interface signal processing unit in such a manner that the digital image data signal output from the first digital interface connector to the second digital interface connector is blocked in response to the remote control signal provided from the mounted wireless communication module, or may further control the interface signal processing unit in such a manner that the blue light of the digital image data signal provided from the first digital interface connector is adjusted and the digital image data signal of which the blue light is adjusted is reprocessed and output to the second digital interface connector.

In still another embodiment, the first digital interface connector and the second digital interface connector may be provided as connectors of a High-Definition Multimedia Interface standard; and the interface signal processing unit may include: an HDMI input unit receiving the digital image data signal from the first digital interface connector; an HDMI output unit outputting the processed digital image data signal to the second digital interface connector; a switching unit receiving the digital image data signal of each of the multiple channels from the HDMI input unit and being switched to selectively output the digital image data signals for the respective channels by control of the controller; and a TMDS transmitter receiving the digital image data signals for the respective channels from the switching unit and converting the digital image data signals into TMDS level signals for the respective channels for output to the HDMI output unit.

In still another embodiment, the controller may cause switching-off in such a manner that the digital image data signals for the respective channels provided from the HDMI input unit are blocked from being output to the TMDS transmitter; or may cause switching-on in such a manner that the digital image data signals of an R channel and a G channel among the digital image data signals for the respective channels provided from the HDMI input unit to the switching unit are transmitted to the TMDS transmitter, may simultaneously cause switching-off in such a manner that the digital image data signal of a B channel is blocked and is provided to the controller so that the blue light of the digital image data signal is adjusted, and may output the digital image data signal of the B channel of which the blue light is adjusted to the TMDS transmitter in such a manner that the TMDS transmitter reprocesses the digital image data signals of the R channel and the G channel and the digital image data signal of the B channel of which the blue light is adjusted.

According to another aspect of the present invention, a control method of a television viewing control apparatus is provided.

According to the aspect, a control method of a television viewing control apparatus of the present invention includes: using, by the television viewing control apparatus provided between a digital image source and a television, a distance setting unit and a time setting unit to set a viewing distance between a viewer and the television and a viewing time that the viewer is allowed to continuously view the television; controlling an interface signal processing unit in such a manner that when the viewer is detected by an ultrasonic sensor, a distance between the viewer and the television is measured, and when a measured position of the viewer is detected within the set viewing distance, a digital image data signal provided from the digital image source is blocked; and controlling the interface signal processing unit in such a manner that when the viewer is detected by the ultrasonic sensor and the set viewing time elapses from the time of the detection, blue light of the digital image data signal provided from the digital image source is adjusted and the digital image data signal of which the blue light is adjusted is reprocessed and is provided to the television.

In an embodiment of the aspect, the control method may further include: mounting, to the television viewing control apparatus, a mounted wireless communication module cooperating with a smartphone over a wireless network, and controlling the interface signal processing unit, when the mounted wireless communication module receives a remote control signal from the smartphone, to block the digital image data signal provided from the digital image source in response to the remote control signal, or controlling the interface signal processing unit to adjust the blue light of the digital image data signal provided from the digital image source and to reprocess the digital image data signal of which the blue light is adjusted for provision to the television.

In another embodiment, at the controlling of the interface signal processing unit, the digital image data signal provided from the digital image source is processed into a digital image data signal for each of multiple channels, and the interface signal processing unit is switched off to block all the digital image data signals for the respective channels from being output to the television, or switching-on is performed for the digital image data signals of an R channel and a G channel among the digital image data signals for the respective channels and simultaneously switching-off is performed for the digital image data signal of a B channel to adjust the blue light of the digital image data signal such that the interface signal processing unit reprocesses the digital image data signals of the R channel and the G channel and the digital image data signal of the B channel of which the blue light is adjusted.

Advantageous Effects

As described above, according to the present invention, the television viewing control apparatus provided between the digital image source and the television is configured to use the ultrasonic sensor for measuring the distance between the viewer and the television in real time such that output of the digital image data input to the television is blocked, to check the set continuous viewing time such that the blue light of the digital image data is reprocessed for output, or to remotely control television viewing through the wireless network, whereby television viewing time and close viewing for children in adolescence are regulated to protect children's eyesight and improve television viewing habits.

Also, the television viewing control apparatus of the present invention is simply connected to an HDMI signal input terminal of the television such that television viewing is properly regulated depending on needs and situations.

Also, the television viewing control apparatus of the present invention is equipped with a wireless communication module when necessary and uses an application of an external smartphone to control television viewing indoors and outdoors.

Also, the television viewing control apparatus of the present invention regulates television viewing by receiving power through the HDMI signal input terminal, a USB terminal of the television, and the like without using an external power source.

DESCRIPTION OF DRAWINGS

FIG. 1 is a block diagram illustrating a connection configuration between a television viewing control apparatus and a television according to the present invention;

FIG. 2 is a perspective view illustrating a configuration of the television viewing control apparatus shown in FIG. 1;

FIG. 3 is a block diagram illustrating a configuration of the television viewing control apparatus shown in FIG. 2;

FIG. 4 is a circuit diagram illustrating a configuration of an interface signal processing unit shown in FIG. 3; and FIG. 5 is a flowchart illustrating a control sequence for a television viewing control apparatus according to the present invention.

BEST MODE

It should be understood that the embodiment of the present invention may be changed to a variety of embodiments and the scope and spirit of the present invention are not limited to the embodiment described hereinbelow. The embodiments of the present invention are provided in order to fully describe the invention for those skilled in the art. Therefore, shapes and sizes of the elements in the drawings may be exaggerated for a more precise description.

Hereinafter, an embodiment of the present invention will be described in detail with reference to the accompanying FIGS. 1 to 5.

FIG. 1 is a block diagram illustrating a connection configuration between a television viewing control apparatus and a television according to the present invention.

Referring to FIG. 1, the television viewing control apparatus 100 of the present invention is configured to be placed between a digital image source 200 and a television 210 through a digital interface unit (not shown), to measure a distance between the viewer and the television 210 and to block the output of a digital image data signal when the viewer views the television 210 at a position within a set distance, to adjust the blue light of the digital image data signal provided from the digital image source 200 when viewing continuously even after a set viewing time has elapsed, and to control television viewing and blue light adjustment when a remote control signal is received from a smartphone 220 over a wireless network 20.

To this end, the television viewing control apparatus 100 of the present invention is connected to the digital image source 200 and to the television 210 through a digital interface cable 10, and is connected to the smartphone 220 through the wireless network 20.

In the embodiment of the present invention, the digital interface unit and the digital interface cable 10 use a protocol of the High-Definition Multimedia Interface (HDMI) standard. Further, in the embodiment of the present invention, the wireless network 20 includes Bluetooth, Wi-Fi, and the like.

Specifically, using FIGS. 2 to 4, a configuration and a function of the television viewing control apparatus according to the present invention will be described in detail.

That is, FIG. 2 is a perspective view illustrating a configuration of the television viewing control apparatus shown in FIG. 1; FIG. 3 is a block diagram illustrating a configuration of the television viewing control apparatus shown in FIG. 2; and FIG. 4 is a circuit diagram illustrating a configuration of the interface signal processing unit shown in FIG. 3.

Referring to FIGS. 2 to 4, the television viewing control apparatus 100 of the present invention processes: a screen blocking mode function in which the distance between the viewer and the television 210 is detected in real time using the ultrasonic sensor 150 and when the viewer is detected within a set viewing distance, the digital image data signal input to the television 210 is blocked; a continuous-viewing blocking mode function in which during viewing the television 210, when it is detected that the viewer continuously views for a set time or longer in a mode for reducing blue light that gives bad influence on eyesight, the digital image data signal of the blue (B) channel among the input digital image data signals is reprocessed such that the output is performed by reducing the blue light; and a remote control mode function in which the television viewing time is regulated and blue light adjustment is controlled using an application (not shown) of the smartphone 220.

Specifically, the television viewing control apparatus 100 of the present invention includes an HDMI input connector 120, an HDMI output connector 130, a distance setting unit 140, a time setting unit 142, an ultrasonic sensor 150, a mounted wireless communication module 160, and a control unit 102. The television viewing control apparatus 100 of the present invention operates receiving power through an HDMI interface unit of the television 210 without using an external power source. It should be noted that the television viewing control apparatus 100 may receive power through a USB terminal of the television 210 or may use a power supply adapter.

The HDMI input connector 120 is provided as an HDMI connector placed in an HDMI interface unit (not shown) of the digital image source 200, for example, a set-top box, a computer, a digital video player, or the like, and is connected to the control unit 102 via an HDMI cable 122. The HDMI output connector 130 is provided as an HDMI connector placed in an HDMI interface unit (not shown) of the television 210, and is connected to the control unit 102 via an HDMI cable 132.

The distance setting unit 140 is, for example, provided in a form of a control lever which is capable of adjustment in units of a predetermined distance, is placed in such a manner that distance adjustment is possible at an outer side of the control unit 102, and sets a distance between the television 210 and the viewer, namely, the viewing distance. Distance information set by the distance setting unit 140 is stored in a controller (104 in FIG. 3) of the control unit 102.

The time setting unit 142 is, for example, provided in a form of an adjustment lever which is capable of adjustment in units of a predetermined time, is placed in such a manner that time adjustment is possible at an outer side of the control unit 102, and sets a time for limiting continuous viewing of the television 210, namely, a viewing time that continuous viewing is allowed. Time information set by the time setting unit 142 is stored in the controller 104 of the control unit 102. To this end, the controller 104 is provided with a timer (not shown).

The ultrasonic sensor 105 is electrically connected to the control unit 102 via a cable and detects the position of the viewer who views the television 210 to measure viewing distance between the television 210 and the viewer in real time. The ultrasonic sensor 105 provides the measured distance information to the controller 104.

The mounted wireless communication module 160 is provided in a form of a detachable module at a side of the control unit 102 and is interconnected with the smartphone 220 over the wireless network 20. In this embodiment, the wireless network 20 includes, for example, Bluetooth, Wi-Fi, and the like.

The mounted wireless communication module 160 is provided with a pin header 162 having multiple pins protruding outwards, and via the same is inserted into a pin socket (106 in FIG. 3) provided at a side of the control unit 102 for electrical connection. When a remote control signal is received from the smartphone 220 over the wireless network 20, the mounted wireless communication module 160 transfers the received remote control signal to the controller 104.

Further, the control unit 102 performs control in such a manner as to process all the operations of the television viewing control apparatus 100. That is, the control unit 102 receives a digital image data signal from the digital image source 200 and output an image to be displayed on the television 210. The control unit 102 stores the distance information set by the distance setting unit 140 and the time information set by the time setting unit 142 in an internal memory (not shown).

The control unit 102 receives the measured distance information between the viewer and the television 210 from the ultrasonic sensor 150 in real time and compares the measured distance information with the set distance information. The control unit 102 blocks the output of the digital image data signal when the viewer views the television 210 at a position within the set distance information.

When the viewer continuously views even after the set viewing time has elapsed, that is, when the viewer is detected by the ultrasonic sensor 150 and from the time of the detection, the viewer is detected continuously for a predetermined time or longer, the control unit 102 reprocesses the digital image data signal provided from the digital image source 200 by adjusting the blue light thereof and outputs the reprocessed digital image data signal to the television 210.

When the remote control signal is received from the smartphone 220 over the wireless network 20, in response to the received remote control signal, the control unit 102 blocks the digital image data signal output to the television 210 or adjusts the blue light to be output, thereby regulating viewing the television 210.

In this embodiment, the control unit 102 includes, as shown in FIG. 3, an interface signal processing unit 110, the distance setting unit 140, the time setting unit 142, and the controller 104.

The controller 104 is, for example, provided as a micro control unit, a processor, a controller, or the like, is provided with a memory, a timer, and the like therein, and is electrically connected to the pin socket 106 into which the pin header 162 of the mounted wireless communication module 160 is inserted. The controller 104 controls the interface signal processing unit 110, the distance setting unit 140, the time setting unit 142, the ultrasonic sensor 150, and the mounted wireless communication module 160. The controller 104 stores the set distance information and the set time information in the internal memory.

The controller 104 performs control in such a manner that the digital image data signal input from the digital image source 200 to the interface signal processing unit 110 is received and processed and the digital image data signal is output to the television 210. During output of the digital image data signal, when the viewer is detected by the ultrasonic sensor 150 and the position of the viewer is within the set distance information as the result of determining whether the measured distance information between the viewer and the television 210 is within the set distance information, the controller 104 controls the interface signal processing unit 110 to block the output of the digital image data signal.

When the viewer continuously views for the set viewing time or longer, that is, when the viewer is detected by the ultrasonic sensor 150 and from the time of the detection, the viewer is detected continuously for the set viewing time or longer, the controller 104 adjusts the blue light of the digital image data signal input from the digital image source 200 and outputs the result to the interface signal processing unit 110. Then, the interface signal processing unit 110 reprocesses the digital image data signal of which the blue light is adjusted by the controller 104 and outputs the result to the television 210.

When the remote control signal is received from the mounted wireless communication module 160, in response thereto, the controller 104 controls the interface signal processing unit 110 to block or transmit the digital image data signal output to the television 210, or controls the interface signal processing unit 110 to adjust the blue light.

The interface signal processing unit 110 receives an HDMI image data signal through the HDMI input connector 120 and transfers the same to the HDMI output connector 130. The interface signal processing unit 110 is controlled by the controller 104 to process the HDMI image data signal output to the television 210 in such a manner to be blocked or transmitted. The interface signal processing unit 110 receives and reprocesses the HDMI image data signal of which the blue light is adjusted by the controller 104 and processes the reprocessed digital image data signal to be transmitted to the television 210.

Specifically, the interface signal processing unit 110 includes, as shown in FIG. 4, an HDMI input unit 111, a switching unit 112, a transition-minimized differential signaling (TMDS) transmitter 113, and an HDMI output unit 117. In FIG. 4, only the configuration for processing the HDMI image data signal in the interface signal processing unit 110 is shown, and the configuration for processing an HDMI audio data signal is not shown. However, the interface signal processing unit 110 has a configuration according to a typical HDMI interface standard for processing digital image and audio data signals, and it is obvious that it is possible to process a digital image data signal as well as a digital audio data signal in such a manner to be blocked or transmitted. Therefore, a detailed description of the configuration and the function of processing the digital audio data signal will be omitted.

The HDMI input unit 111 receives the HDMI image data signal from the HDMI input connector 120. The HDMI input unit 111 receives, for example, the HDMI image data signal in three color (R, G, and B) channels. Each of the channels (R, G, and B) consists of an 8-bit HDMI image data signal.

The switching unit 112 is provided as, for example, a switch array that consists of multiple switches corresponding to the channels (R, G, and B), and is switched for each of the channels (R, G, B) by receiving a control signal (ON/OFF) of the controller 104.

When the controller 104 adjusts the blue light of the HDMI image data signal, the switching unit 112 is switched on such that the HDMI image data signals of the R channel and the G channel among the HDMI image data signals input from the HDMI input unit 111 are transmitted to the TMDS transmitter 113, and is switched off to block the HDMI image data signal (BL_DATA) of the B channel for provision to the controller 104.

Then, the controller 104 receives the HDMI image data signal (BL_DATA) of the B channel to adjust the blue light, and transmits the HDMI image data signal (BL_DATA') of the B channel of which the blue light is adjusted to the TMDS transmitter 113.

In this embodiment, the controller 104 sets the frequency of the clock signal for the HDMI image data signal of the B channel to be lower than the ordinary frequency (for example, about 50%, or so on), and outputs the HDMI image data signal (BL_DATA') of the B channel to the TMDS transmitter 113 by synchronizing the same with the set clock signal. Then, the TMDS transmitter 113 reprocesses the HDMI image data signals of the R channel and the G channel and the HDMI image data signal of the B channel of which the blue light is adjusted for output.

Further, when the ultrasonic sensor 150 detects the position of the viewer within the set distance information, when the viewer continuously views the television 210 for the set viewing time or longer by the time setting unit 142 after the ultrasonic sensor 150 detects the viewer, or when the remote control signal is received from the mounted wireless communication module 160, in response thereto, the controller 104 switches off all or a part of the switching unit 112 to block the HDMI image data signal output from the interface signal processing unit 110, or adjusts the blue light.

The TMDS transmitter 113 receives the HDMI image data signal from the HDMI input unit 111 for each of the channels (R, G, B) and converts the same into a TMDS level signal for each of the channels (R, G, B) for output. The TMDS level signal converted by the TMDS transmitter 113 is decoded into the HDMI image data signal by the television 210.

In this embodiment, the TMDS transmitter 113 includes an encoder 114, a phase lock loop (PLL) circuit 116, and multiple differential amplifiers 115.

The encoder 114 is, for example, provided as an encoder (8b/10b data encoder) encoding 8-bit data into 10-bit data and encodes the HDMI image data signal transmitted from the HDMI input unit 111 which is synchronized with the clock signal output from the PLL circuit 116 into the TMDS level signal for each of the channels (R, G, and B).

The PLL circuit 116 outputs the clock signal to the encoder 114. Each of the differential amplifiers 115 amplifies the TMDS level signal for each of the channels (R, G, and B) output from the encoder 114 and the clock signal and outputs the same to the HDMI output unit 117.

The HDMI output unit 117 receives the TMDS level signal and the clock signal output from the TMDS transmitter 113 and outputs the same to the HDMI output connector 130 to be transmitted to the television 210. Then, the television 210 receives the TMDS level signal and the clock signal transmitted from the HDMI output connector 130 through a TMDS receiver (not shown) and decodes the same into the HDMI image data signal to output an image.

FIG. 5 is a flowchart illustrating a control sequence for a television viewing control apparatus according to the present invention. The sequence is a program that the controller 104 of the television viewing control apparatus 100 processes, and the program is stored in the internal memory (not shown) of the controller 104. Here, the television viewing control apparatus 100 of the present invention is provided in each digital interface unit (not shown) of the digital image source 200 and the television 210. Further, the mounted wireless communication module 160 is provided in the television viewing control apparatus 100.

Referring to FIG. 5, in the television viewing control apparatus 100 of the present invention, when the viewing distance between the viewer and the television 210 and the viewing time are set using the distance setting unit 140 and the time setting unit 142 at step S300, the controller 104 stores the set distance information and the set time information in the internal memory.

When the viewer is detected by the ultrasonic sensor 150 at step S310, the controller 104 measures the distance between the viewer and the television 210 and determines whether the measured position of the viewer is detected within the set distance. As the result of the determination, when the viewer is detected within the set distance, the controller 104 proceeds to step S320 and controls the interface signal processing unit 110 to block the digital image data signal provided from the digital image source 200, then proceeds to step S310.

Conversely, as the result of the determination, when the viewer is not detected within the set distance, the controller 104 proceeds to step S330 and controls the interface signal processing unit 110 to provide the digital image data signal, provided from the digital image source 200, to the television 210 such that an image is output.

At step S340, the controller 104 determines whether the set viewing time elapses after viewing the television 210 starts, specifically, after the viewer is detected by the ultrasonic sensor 150. As the result of the determination, when the viewer is detected and the set viewing time elapses from the time of the detection, the controller 104 proceeds to step S350 and controls the interface signal processing unit 110 to adjust the blue light of the digital image data signal provided from the digital image source 200, and controls the interface signal processing unit 110 to provide the digital image data signal of which the blue light is adjusted to the television 210 such that an image is output at step S360.

Conversely, as the result of the determination, when the viewer is detected and the set viewing time does not elapse from the time of the detection, the controller 104 proceeds to step S330.

At step S370, the controller 104 determines whether the remote control signal is received from the mounted wireless communication module 160. As the result of the determination, when the remote control signal is not received, proceeding to step S360 takes place.

Conversely, as the result of the determination, when the remote control signal is received, proceeding to step S380 takes place and the controller 104 controls image output. Here, the process of steps S370 to S380, namely, the remote control mode function, is processed after the screen blocking mode function, and the continuous-viewing blocking mode function are processed as shown in FIG. 5, but may be processed first in any of step S300 to S350.

Although the configuration and the operation of the television viewing control apparatus according to the present invention have been described in detail with reference to the drawings, this is merely an example, and various changes and modifications are possible without departing from the technical spirit of the present invention.

The invention claimed is:

1. A television viewing control apparatus (100) comprising:
   a first digital interface connector provided in a digital image source (200);
   a second digital interface connector provided in a television (210);
   a distance setting unit (140) setting a viewing distance between the television (210) and a viewer;
   an ultrasonic sensor (150) measuring a viewing distance between the television (210) and the viewer;
   an interface signal processing unit (110) receiving a digital image data signal from the first digital interface connector to process the digital image data signal for each of multiple channels and outputting the resulting signal to the second digital interface connector; and
   a controller (104) storing viewing distance information set by the distance setting unit (140) and controlling the interface signal processing unit (110) to block the digital image data signal output from the first digital interface connector to the second digital interface connector when the viewing distance measured by the ultrasonic sensor (150) is within the viewing distance set by the distance setting unit (140),
   wherein the television viewing control apparatus (100) further comprises a time setting unit (142) setting a viewing time that the viewer is allowed to continuously view the television (210), and
   the controller (104) stores viewing time information set by the time setting unit (142) and further controls the interface signal processing unit (110) in such a manner that when the viewer is detected by the ultrasonic sensor (150) and the viewing time set by the time setting unit (142) elapses, blue light of the digital image data signal provided from the first digital interface connector is adjusted and the digital image data signal of which the blue light is adjusted is reprocessed and is output to the second digital interface connector, wherein the television viewing control apparatus (100) further comprises a mounted wireless communication module (160) receiving a remote control signal from a smartphone (220) over a wireless network (20) and providing the remote control signal to the controller (104), and the controller (104) further controls the interface signal processing unit (110) in such a manner that the digital image data signal output from the first digital interface connector to the second digital interface connector is blocked in response to the remote control signal provided from the mounted wireless communication module (160), or further controls the interface signal processing unit (110) in that the blue light of the digital image data signal provided from the first digital interface connector is adjusted and the digital image data signal of which the blue light is adjusted is reprocessed and output to the second digital interface connector, wherein the first digital interface connector and the second digital interface connector are provided as connectors of a High-Definition Multimedia Interface (HDMI) standard, the interface signal processing unit (110) includes:

an HDMI input unit (111) receiving the digital image data signal from the first digital interface connector;

an HDMI output unit (117) outputting the processed digital image data signal to the second digital interface connector;

a switching unit (112) receiving the digital image data signal of each of the multiple channels from the HDMI input unit (111) and being switched to selectively output the digital image data signals for the respective channels by control of the controller (104); and a transition-minimized differential signaling (TMDS) transmitter (113) receiving the digital image data signals for the respective channels from the switching unit (112) and converting the digital image data signals into TMDS level signals for the respective channels for output to the HDMI output unit (117), and the controller (104) is configured to, cause switching-off in such a manner that the digital image data signals for the respective channels provided from the HDMI input unit (111) to the switching unit (112) are blocked from being output to the TMDS transmitter (113); or cause switching-on in such a manner that the digital image data signals of a red Yt channel and a green (G) channel among the digital image data signals for the respective channels provided from the HDMI input unit (111) to the switching unit (112) are transmitted to the TMDS transmitter (113), simultaneously cause switching-off in such a manner that the digital image data signal of a blue (B) channel is blocked and is provided to the controller (104) so that the blue light of the digital image data signal is adjusted, and output the digital image data signal of the B channel of which the blue light is adjusted to the TMDS transmitter (113) in such a manner that the TMDS transmitter (113) reprocesses the digital image data signals of the R channel and the G channel and the digital image data signal of the B channel of which the blue light is adjusted.

* * * * *